US012769808B2

(12) United States Patent
Fonseca et al.

(10) Patent No.: US 12,769,808 B2
(45) Date of Patent: Oct. 20, 2026

(54) FLEXIBLE AND DYNAMIC MANAGEMENT OF FEATURE LICENSES ON NETWORK DEVICES

(71) Applicant: Hewlett Packard Enterprise Development LP, Spring, TX (US)

(72) Inventors: Francisco Jose Rojas Fonseca, Alajuela (CR); Jorge Arturo Carvajal, Heredia (CR); Robert R. Brodeur, Auburn, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 226 days.

(21) Appl. No.: 18/676,016

(22) Filed: May 28, 2024

(65) Prior Publication Data

US 2025/0371113 A1 Dec. 4, 2025

(51) Int. Cl.
*G06F 21/10* (2013.01)
*H04L 9/40* (2022.01)

(52) U.S. Cl.
CPC ............ *G06F 21/105* (2013.01); *H04L 63/12* (2013.01); *H04L 2463/103* (2013.01)

(58) Field of Classification Search
CPC .. G06F 21/105; H04L 63/12; H04L 2463/103
See application file for complete search history.

(56) References Cited

U.S. PATENT DOCUMENTS

| | | | | |
|---|---|---|---|---|
| 7,983,988 B2 * | 7/2011 | Bouriant | G06Q 10/10 705/54 |
| 8,355,926 B1 * | 1/2013 | Hinz | G06Q 10/10 705/2 |
| 9,104,844 B2 * | 8/2015 | Fang | G06F 21/105 |
| 11,157,255 B2 | 10/2021 | Borthakur et al. | |
| 2004/0249763 A1 * | 12/2004 | Vardi | G06F 21/10 705/59 |
| 2006/0106728 A1 * | 5/2006 | Yellai | G06F 21/105 705/59 |
| 2009/0274304 A1 * | 11/2009 | Kobayashi | G06F 21/1079 726/26 |
| 2011/0004945 A1 * | 1/2011 | Kurokawa | G06F 21/572 726/30 |

(Continued)

FOREIGN PATENT DOCUMENTS

WO WO-2018166398 A1 * 9/2018 ............. H04L 41/28

*Primary Examiner* — Khalid M Almaghayreh
(74) *Attorney, Agent, or Firm* — Hewlett Packard Enterprise Patent Department

(57) ABSTRACT

One aspect of the instant application describes a method, a computer system, and a computer-readable medium which facilitate flexible and dynamic management of feature licenses on a network device. During operation, a network device supporting one or more features can monitor a configuration state associated with the network device. In response to detecting an update of the configuration state, the network device can determine whether a state of a feature is affected. In response to determining that the state of the feature is affected, the network device can determine whether to request issuance or release of a license corresponding to the affected feature and communicate by the network device with a cloud-based license-management platform to request the issuance or release of the license.

16 Claims, 6 Drawing Sheets

(56) References Cited

U.S. PATENT DOCUMENTS

| | | | | |
|---|---|---|---|---|
| 2014/0047506 | A1* | 2/2014 | Yabe | G06F 21/105<br>726/3 |
| 2014/0379593 | A1* | 12/2014 | Koehler | G06F 21/105<br>705/318 |
| 2016/0350519 | A1* | 12/2016 | Pattyn | G06F 21/10 |
| 2018/0176128 | A1* | 6/2018 | Sharma | H04L 41/0806 |
| 2021/0034715 | A1* | 2/2021 | Nosov | H04L 67/53 |
| 2021/0143904 | A1* | 5/2021 | Rao | H04J 14/0291 |
| 2023/0123579 | A1* | 4/2023 | Panikkar | G06F 21/107<br>713/189 |
| 2023/0171442 | A1* | 6/2023 | Babu | H04N 21/2743<br>725/25 |
| 2024/0073030 | A1* | 2/2024 | Sze | H04L 9/0825 |
| 2024/0265396 | A1* | 8/2024 | Minina | H04N 21/47815 |

* cited by examiner

FLEXIBLE AND DYNAMIC MANAGEMENT OF FEATURE LICENSES ON NETWORK DEVICES

BACKGROUND

This disclosure is generally related to managing software licenses on network devices. More specifically, this disclosure is related to flexible and dynamic management of feature licenses.

BRIEF DESCRIPTION OF THE FIGURES

In the figures, like reference numerals refer to the same figure elements.

DETAILED DESCRIPTION

Software is integral to the operation of network devices like switches and routers, providing control, management, security, and performance optimization features essential for modern network environments. Many device vendors preinstall software packages on their network devices to allow users to deploy and operate purchased devices. The preinstalled software packages often include software features that are essential to the basic operation of the devices. For example, preinstalled software packages on network switches and routers typically can allow the customer to deploy, connect, and troubleshoot an enterprise network.

In addition to the basic operation, a device vendor may develop advanced software features that allow the network devices to operate in more complex environments, such as in networks that require enhanced visibility and assurance. For example, certain advanced features deployed on network switches can offer deep visibility with application recognition and application-based policies from Open Systems Interconnection (OSI) layer 2 (i.e., the data link layer) to layer 7 (i.e., the application layer), and certain advanced features can enable scalable Network Address Translation (NAT) and virtual private network (VPN) services. These advanced features may also be preinstalled on the network devices or may be downloadable.

These advanced features can add value to network devices and often require the customer to purchase corresponding licenses. Managing the licenses of software features for a large number of network devices can be burdensome because conventional approaches often require manual installation of a license key or file on each network device. Moreover, the need for software licenses on a particular network device may fluctuate as the network device may activate or deactivate certain software features due to changes in its configuration. For example, when a network switch is configured to join a Virtual Switching Framework (VSF) stack, the network switch needs to have the same type of software license as other switches in the stack. In contrast, when the switch is configured to leave the VSF stack, it no longer needs the software license. The dynamic nature of the license requirement calls for dynamic software license management.

Figure 1:
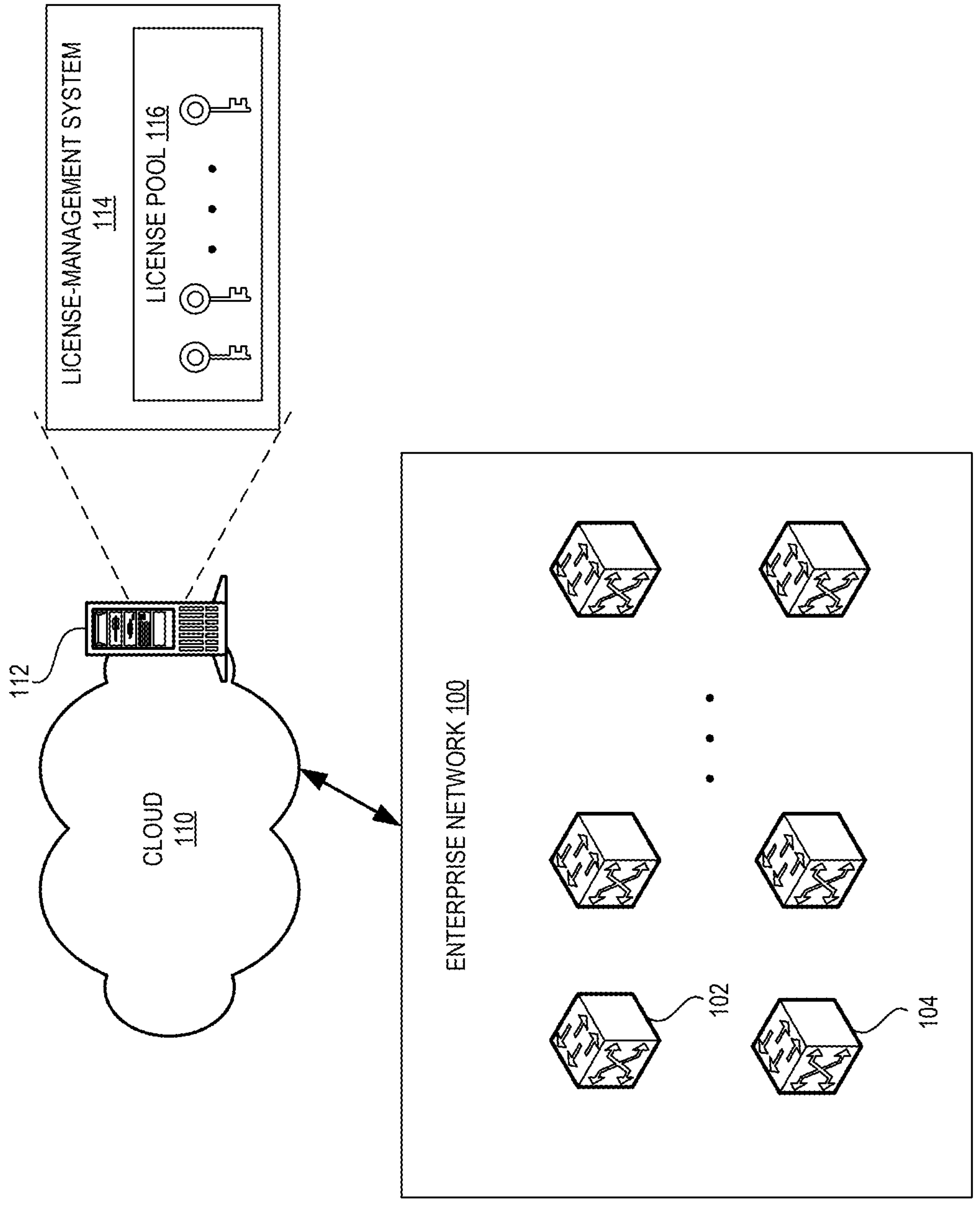
FIG. 1 illustrates an example of a scenario for dynamic management of licenses of software features on network devices, according to one aspect of the instant application.

FIG. 1 illustrates an example of a scenario for dynamic management of licenses of software features on network devices, according to one aspect of the instant application. In FIG. 1, an enterprise network 100 can include a plurality of network devices (e.g., switches, routers, access points, etc.), including switches 102 and 104. Such network devices may be scattered across multiple physical locations and can be installed with both basic features (e.g., control and management, routing, and security features) and advanced features. Although the basic features may not require licenses, the advanced features may need licenses to operate.

Conventional license-management solutions often require the user to manually install a license key or file on each device needing the license. For example, the user can download the file through a management portal provided by the device vendor and then take the file to the site where the network device is located for installation. Such a process can be burdensome to customers with many sites and devices. To alleviate the burden of managing licenses, according to some aspects of the instant application, each network device can reach out to a cloud-based license-management system to automatically obtain a license based on the instant device configuration.

In the example shown in FIG. 1, enterprise network 100 can be communicatively coupled to a cloud server 112 residing in cloud 110. Cloud server 112 can support a license-management system 114 that manages software licenses for many customers. According to some aspects, license-management system 114 can be implemented using hardware components, software components, and a combination thereof. In one example, license-management system 114 can include at least one processing resource and at least one storage medium. For each customer, license-management system 114 can maintain a license pool 116 that includes licenses available to the customer. License pool 116 can be implemented as a data record (e.g., a table) stored in the storage medium of license-management system 114. According to some aspects, license-management system 114 can dynamically distribute licenses among the network devices in enterprise network 100. For example, a network device needing a license can communicate with license-management system 114 to obtain and validate the license. When the license is no longer needed, the network device can release the license back to license pool 116 to allow license-management system 114 to distribute the license to a different network device.

In some examples, a device vendor may group all advanced features into one license pack and only require customers to obtain a single license for the entire pack. In some examples, a device vendor may require customers to obtain one license for each feature. Alternatively, a device vendor may group the advanced features into multiple license packs (e.g., all advanced security features may be grouped into a security packet), and each license pack requires a license.

Many events can affect the need for software licenses on a network device. According to some aspects, a change in the network topology may affect the feature usage on a network device, thus leading to changes in the customer's licensing needs. For example, a virtual switch comprising multiple stacked switches may have activated a certain advanced feature (e.g., a feature supporting application-based policies) that requires a feature license. For the advanced feature to be operable, each physical switch in the stack should have a valid feature license. Hence, when the topology of the virtual switch is modified, the licensing need may change as well. More specifically, each physical switch added to the stack may require a feature license (e.g., a license for a particular software feature to enable the physical switch to operate in sync with other switches in the stack), whereas switches removed from the stack may no longer need the feature license. An example of a virtual switch can include a Virtual Switching Framework (VSF) stack that includes a plurality of member switches.

According to some aspects, a change in the device configuration may also lead to changes in the device's licensing needs. For example, a user may choose to change the security configuration of a network device from basic to advanced or vice versa. The basic security feature can operate without a license, whereas the advanced security feature needs a license. Therefore, when the security configuration is changed from basic to advanced, the network device should request a license from license-management system 114. On the other hand, when the security configuration is changed from advanced to basic, the network device may no longer need the feature license.

In certain situations (e.g., at the initial development stage), a device vendor may offer certain advanced features to users for free. As the device vendor continues to develop and improve these advanced features, they may wish to be compensated for the development cost by requesting users to purchase licenses for these advanced features. For example, after upgrading the software installed on the device to the latest version, the user may be notified that certain advanced software features now require a license to operate. Such licensing policy changes may be a problem for existing customers as they have deployed the devices in their network, and those devices may currently use the advanced features that now require licensing. Changing the licensing requirements for running features may cause a significant burden to customers.

To alleviate the customer's burden, according to some aspects of the instant application, during the software upgrade on a network device, the license-management system can scan the device's configuration to determine whether a feature that requires licensing after the upgrade is currently in use. For example, the license-management system may read the configuration file stored in the device's configuration database. If the feature is currently active, the license-management system may allow such a feature to operate in an honor-based mode, in which the feature can be operational despite not having a valid license. The user may periodically receive a notification as a reminder that the feature requires a valid license. If the user's device does not have any of the advanced features configured, the software upgrade can be performed normally such that the advanced features can be configured but will not become operational unless a license file is installed. This way, the user's existing network services do not face immediate interruption even when the user has not purchased licenses for advanced features.

Figure 2:
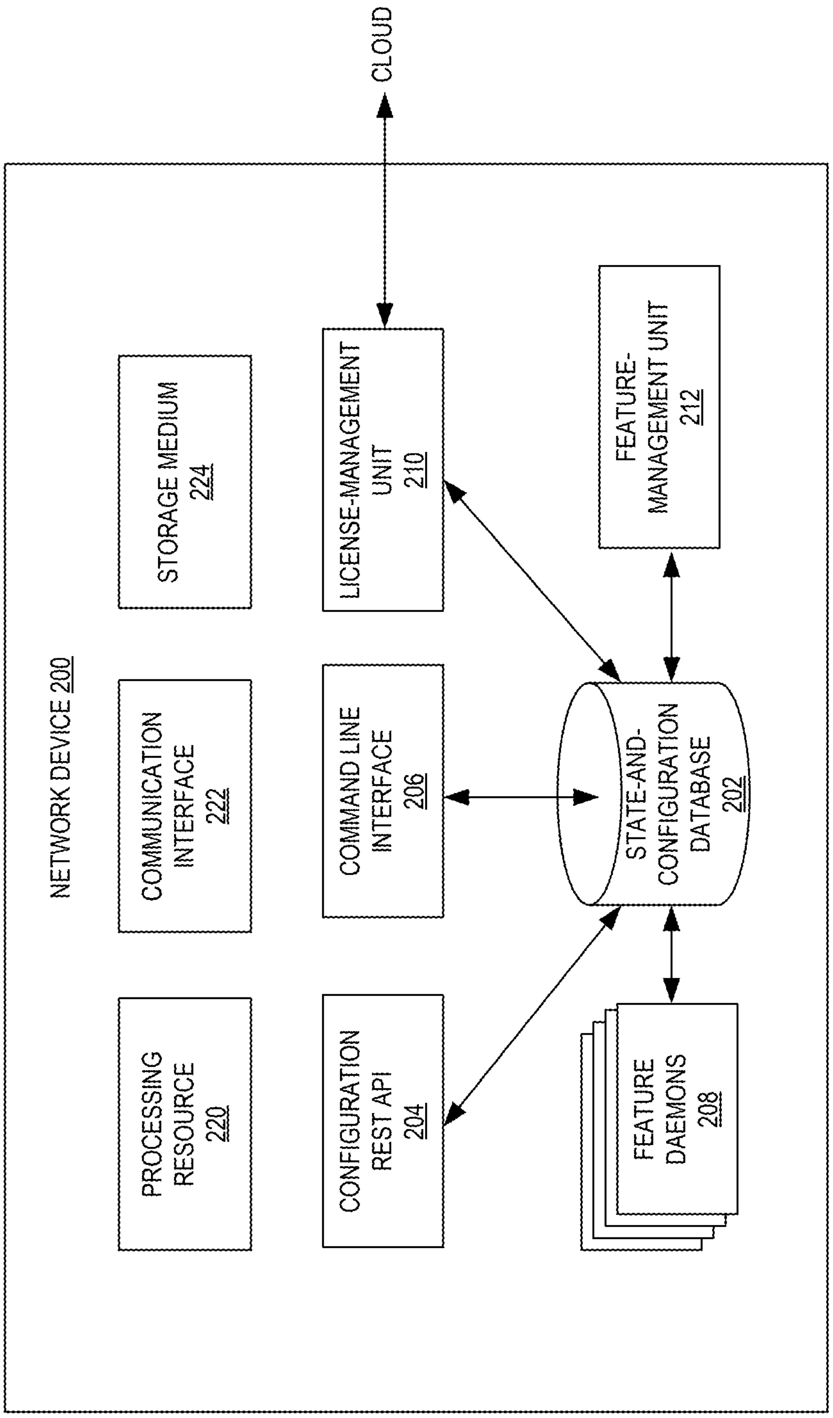
FIG. 2 presents a diagram illustrating an example of a license-management architecture within a network device, according to one aspect of the instant application.

FIG. 2 presents a diagram illustrating an example of a license-management architecture within a network device, according to one aspect of the instant application. Network device 200 can be any physical device that allow hardware on a computer network to communicate and interact with one another. Network device 200 can be a router, a switch, an access point, a NIC, etc. In the example shown in FIG. 2, network device 200 can include a processing resource 220, a communication interface 222, and a storage medium 224. Processing resource 220 can include one or more processors, such as central processing units (CPUs) and graphics processing units (GPUs). Communication interface 222 can include inter-device communication channels for communication with other network devices and/or user devices. The communication channels can be implemented via a regular communication port and based on any open or proprietary format. Storage medium 650 can include both volatile and non-volatile memory devices, such as dual in-line memory modules (DIMMs), hard drives, and flash drives. Network device 200 can further include a state-and-configuration database 202, a REST (Representational State Transfer) application programming interface (API) 204, a command-line interface (CLI) 206, a number of feature daemons 208, a license-management unit 210, and a feature-management unit 212.

According to some aspects, state-and-configuration database 202 can be stored in storage medium 224. For example, state-and-configuration database 202 can be stored in a hard drive associated with network device 200. State-and-configuration database 202 stores state and configuration information associated with various components within network device 200, and all processes running on network device 200 can use this database to exchange their state information. For example, state-and-configuration database 202 can store information associated with the property settings (e.g., contact, location, time zone, administrator username and password, etc.), security settings, VLAN settings, VSF settings, etc. Depending on the user's needs, certain advanced features (e.g., a feature for creating an application-aware access network like the Application Recognition and Control (ARC) feature) available on network device 200 may or may not be configured or activated, and their configurations can be stored in state-and-configuration database 202. When activated, the ARC feature allows a network device to use a deep packet inspection technique to recognize network applications, thus providing application visibility and statistics to the administrator.

A user can configure network device 200 via REST API 204 or CLI 206. A user may access CLI 206 via a management port on network device 200. For example, the user can use SSH client software to reach network device 200 from a computer (e.g., a PC or laptop) to access CLI 206. The user can directly input commands (e.g., by typing command lines) in CLI 206 to modify a configuration file stored in state-and-configuration database 202. For example, the user can configure network device 200 as a member switch of a virtual switch comprising multiple stacked switches by entering commands in CLI 206. In situations where network device 200 is connected to a cloud-based network management system, the user can access state-and-configuration database 202 via a web portal of the cloud-based network management system. In one example, the cloud-based network management system can support a set of REST APIs (e.g., configuration REST API 204). A user can view and edit configuration files stored in state-and-configuration database 202 via configuration REST API 204.

Feature daemons 208 correspond to various features (e.g., basic features like a security feature and advanced features like the ARC feature) supported by network device 200. Each feature daemon can run as a background process to facilitate the operation of the feature. For example, an SSH daemon may facilitate secure communication between network device 200 and a remote server, and the ARC feature daemon may inspect the header of the first few packets of a TCP/UDP flow to identify the application associated with the flow.

License-management unit 210 can monitor changes in the configuration state of network device 200 by interacting with state-and-configuration database 202. For example, license-management unit 210 can periodically (e.g., hourly or daily) send a request (e.g., a memory read request) to state-and-configuration database 202 to read the security configuration file to determine whether the security configuration of network device 200 has been modified. In another example, license-management unit 210 may also periodically read the topology configuration file to determine whether the network topology associated with network device 200 is updated (e.g., whether network device 200 becomes a member switch of a VSF stack).

License-management unit 210 can determine whether the state of a feature is affected due to changes in the configuration state of network device 200. For example, license-management unit 210 may determine that a previously unused feature needs to be activated due to the configuration change of network device 200. In another example, license-management unit 210 may determine that a previously running feature is no longer needed and can be deactivated responsive to a change in the configuration of network device 200. According to some aspects, license-management unit 210 can also determine whether the state of a feature pack comprising multiple features is affected. A feature pack is considered inactive if no feature within the pack is activated or configured. On the other hand, it is considered active if at least one feature within the pack is activated or configured. In certain implementations, the entire feature pack may be associated with a single license.

In response to determining that the state of a feature is affected by the configuration change (i.e., the feature is activated or deactivated), license-management unit 210 can interact with a cloud-based license-management system (e.g., via a web portal) to request the issuance or release of a license associated with the feature. For example, if a previously unused feature is activated, license-management unit 210 can reach out to the cloud-based license-management system, requesting the issuance of a license. The cloud-based license-management system maintains a license pool for each customer (e.g., license pool 116 shown in FIG. 1). The licenses can be floating licenses (meaning they are not bound to particular devices) and can be distributed among the customer's network devices. Responsive to the issuance request, the cloud-based license-management system can determine whether the license pool has unused licenses associated with the feature. If so, the cloud-based license-management system can assign a license from the license pool to network device 200 to allow the feature to operate normally. In one example, the cloud-based license-management system can send a license file or license key associated with the requested license to network device 200 via a secure channel. The license file or key can be stored in storage medium 224. When a corresponding feature daemon executes the feature, it can read the stored license file or key to determine whether the feature is licensed. After the issuance of each license, the number of unused licenses in the license pool can decrease accordingly. More specifically, the identity of network device 200 (e.g., the serial number and/or MAC address) can be registered at the cloud-based license-management system and associated with the issued license.

If there is no unused license in the license pool, the cloud-based license-management system can notify license-management unit 210 that no license is available. In one example, the cloud-based license-management system can send, via communication interface 222, a message to license-management unit 210 to indicate that the requested license is not available. According to some aspects, the activated or configured feature may be inoperable without a license. In such a situation, the customer may preemptively set up a charge account (e.g., a credit card or bank account) with the cloud-based license-management system to pre-authorize the purchase of a license. For example, if the cloud-based license-management system receives a license request from a customer's network device and determines that the license pool of that particular customer is empty, the cloud-based license-management system can automatically purchase a license on behalf of the customer and add the purchased license to the license pool for distribution. According to alternative aspects, an activated or configured feature can operate in an honor-based mode if it does not have a valid license. While the feature is operating in the honor-based node, the cloud-based license-management system can periodically send a notification to network device 200, reminding the customer that a valid license is needed for the feature.

If a previously active feature is no longer needed or deactivated, license-management unit 210 can communicate with the cloud-based license-management system to release the license back to the license pool (e.g., the license file may be deleted from network device 200). For example, license-management unit 210 can delete the license file or key stored in storage medium 224 and send, via communication interface 222, a message to the cloud-based license-management system to allow it to disassociate the license with network device 200. Once released, the license can be distributed to a different network device of the customer. The dynamic and automatic allocation of licenses to the customer's devices can simplify the overall configuration effort of the customer, as the customer can set the cloud-based license-management system for automatic deployment of feature licenses based on feature usage, instead of statically assigning the licenses to the customer's devices.

Communication between license-management unit 210 and the cloud-based license-management system should be secure. According to some aspects, network device 200 can include a trusted platform module (TPM) (not shown in FIG. 2), which can provide a hardware root of trust. The TPM can facilitate the establishment of a secure communication channel between license-management unit 210 and the cloud-based license-management system. According to some aspects, the secure communication channel can be an SSH channel, and the SSH keys can be stored inside the TPM. Note that this TPM-based secure channel is not a persistent connection and can be established on demand, thus reducing the load on the cloud-based license-management system.

According to some aspects, the communication between license-management unit 210 and the cloud-based license-management system can also be used to periodically validate an existing license. When a licensed feature is running on network device 200, license-management unit 210 may periodically (e.g., daily or hourly) communicate with the cloud-based license-management system to validate that the license is still assigned to network device 200. For example, the cloud-based license-management system may periodically read a license file stored at a predetermined memory location within network device 200. The license may be revoked if such communication is interrupted. In addition to the periodical communication, license-management unit 210 may also interact with the cloud-based license-management system whenever there is a change in the conditions around the license validation, whether it is the configuration of network device 200, the network topology, or anything that can impact the license validity. According to some aspects, in response to detecting a configuration change, license-management unit 210 can send a notification via communication interface 222 to the cloud-based license-management system, prompting it to validate the status of one or more feature licenses on network device 200.

Feature-management unit 212 can be responsible for managing the state of the features. More specifically, after a feature license is issued to network device 200, feature-management unit 212 can read the license file stored in storage medium 224 and update the state of the feature in state-and-configuration database 202. For example, the license file may specify the associated feature and the subscription duration (e.g., six months or one year) of the license. Accordingly, feature-management unit 212 can update the state of the associated feature, indicating that it has a valid license for that specified duration. Similarly, after a license of a feature is released back to the license pool or is revoked for some reason, feature-management unit 212 can update the state of that feature as unlicensed.

A feature daemon can communicate with state-and-configuration database 202 to determine the state of a corresponding feature and behave according to the determined state. For example, a feature daemon can determine whether the corresponding feature is configured and has a valid license. If so, the feature can operate in the normal mode. If the feature daemon determines that the feature is configured but the corresponding license is invalid (e.g., the license is expired or revoked due to certain errors), the feature can operate in the honor-based mode. Allowing the network device to operate a feature in the honor-based mode can prevent disruptions to the customer's network when a network condition or the user's action invalidates the license. The customer may subsequently recover from this condition without having to worry about the network or key functionality on the network going down. While the network device is operating a feature in the honor-based mode, a notification can be sent periodically (e.g., daily or weekly) to the customer, indicating that a valid license is needed for a running feature. In one example, the notification may be displayed on a display associated with network device 200.

Figure 3:
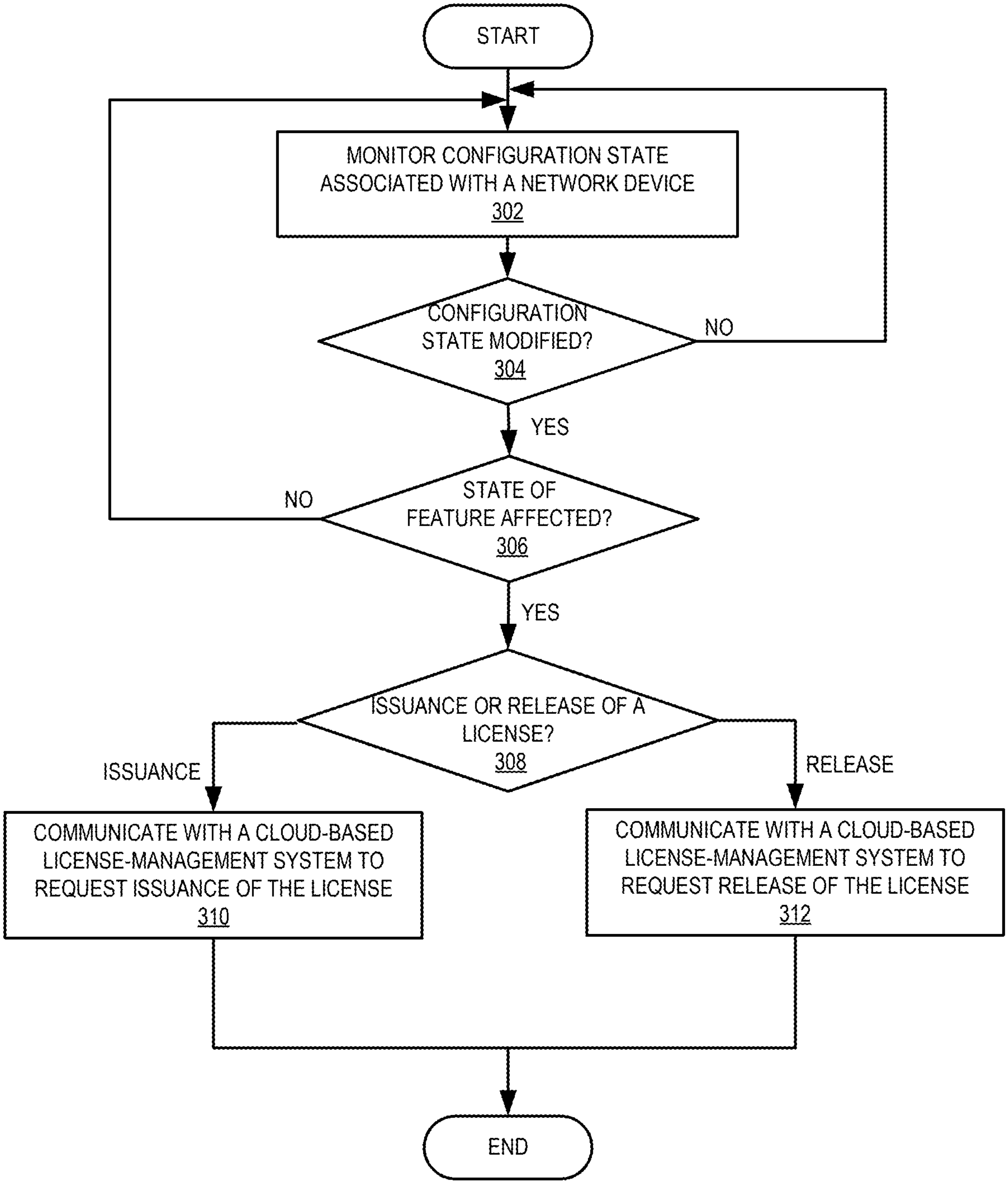
FIG. 3 presents a flowchart illustrating an example of the license-management process, according to one aspect of the instant application.

FIG. 3 presents a flowchart illustrating an example of the license-management process, according to one aspect of the instant application. This license-management process can be performed by a license-management unit (e.g., license-management unit 210 shown in FIG. 2) residing on a network device (e.g., network device 200 shown in FIG. 2) to manage feature licenses for the network device. During operation, the license-management unit monitors the configuration state associated with the network device (operation 302). The network device can refer to any electronic device that facilitates the communication and exchange of data within a computer network. Examples of network devices can include but are not limited to routers, switches, modems, access points, network interface cards (NICs), repeaters, firewalls, etc. According to some aspects, the network device can maintain a state-and-configuration database that stores the states and configurations of various units or components within the network device. The license-management unit can monitor the state-and-configuration database.

While monitoring the configuration state, the license-management unit can determine whether the configuration state of the network device is modified (operation 304). The configuration state of the network device may be modified under various circumstances. In one example, the configuration state may be modified by a user entering a command in the CLI. In another example, the configuration state may be modified due to changes in the network topology.

If the configuration state of the network device remains unchanged, the license-management unit may continue with the monitoring (operation 302). In one example, the license-management unit may periodically (e.g., hourly or daily) read the configuration files stored at a predetermined memory location (e.g., within storage medium 224 shown in FIG. 2). If the configuration state of the network device is modified, the license-management unit can determine whether the state of a feature is affected by the modified configuration state (operation 306). The feature can include an advanced software feature that can be preinstalled on the network device or downloaded from a cloud-based device-management portal. The feature may require a license to be operable. Note that the modification to the configuration state of the network device may cause the activation of certain unused features or the deactivation of certain running features. In one example, a user may configure the network device to be part of a VSF switch, thus requiring features associated with the VSF functionalities to be activated. In one example, the user may configure the network device to operate with enhanced security, thus requiring the activation of an advanced security feature. In an alternative example, the user may lower the security requirement on the network device, meaning that the advanced security feature is no longer needed and can be deactivated.

If the state of the software feature is not affected by the modified configuration state, the license-management unit may continue with the monitoring (operation 302). If the state of the software feature is affected, the license-management unit can determine whether to request the issuance or release of a license corresponding to the affected feature (operation 308). More specifically, the license-management unit can determine whether the affected feature is activated or inactivated. If a previously unused or inactive feature is activated, the license-management unit can communicate with a cloud-based license-management system to request the issuance of the license (operation 310). If a previously active feature is deactivated, the license-management unit can communicate with the cloud-based license-management system to request the release of the license (operation 312).

Figure 4:
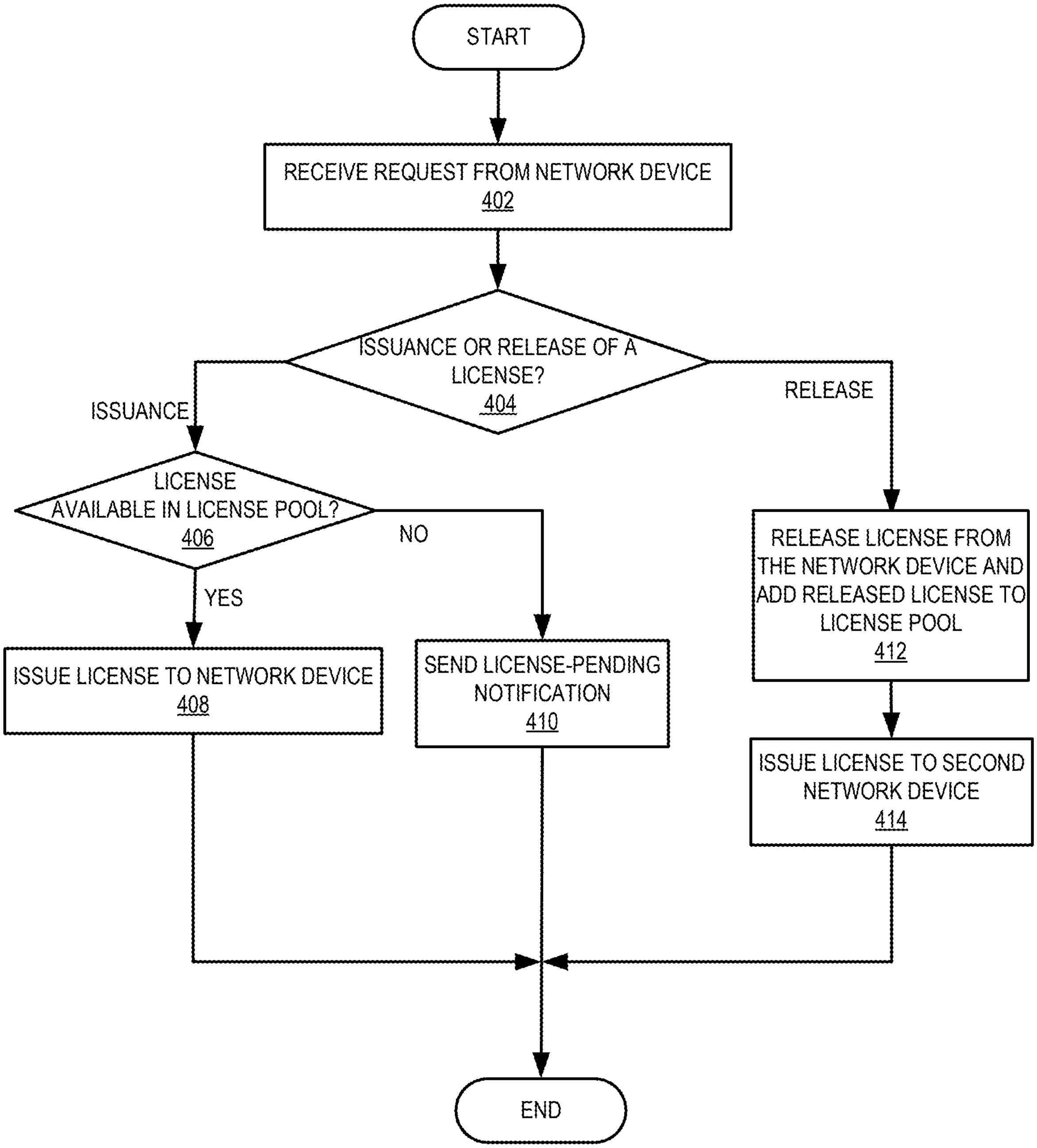
FIG. 4 presents a flowchart illustrating an example of the license-management process, according to one aspect of the instant application.

FIG. 4 presents a flowchart illustrating an example of the license-management process, according to one aspect of the instant application. This license-management process can be performed by a cloud-based license-management system (e.g., license-management system 114 shown in FIG. 1) responsible for managing feature licenses for a plurality of customers. The cloud-based license-management system can reside in the cloud. Each customer can register their network devices with the cloud-based license-management system such that, once deployed and configured, a network device can communicate with the license-management system via a secure communication channel (e.g., a TPM-based channel).

During operation, the cloud-based license-management system can receive a request from a network device (e.g., network device 200 shown in FIG. 2) (operation 402). The cloud-based license-management system can determine whether the request is for the issuance or release of a license corresponding to a feature (operation 404). As discussed previously, due to a change in the configuration state, the state of a feature may be affected. A previously inactive feature may be activated and require the license to operate, and a previously running feature may be deactivated and no longer need the license.

If the request is for the issuance of the license, the cloud-based license-management system can examine a license pool (e.g., license pool 116 shown in FIG. 1) associated with the customer owning the network device to determine whether a license is available in the license pool (operation 406). According to some aspects, upon receiving a license request, the cloud-based license-management system can associate the network device with a customer account. The customer account can keep a record of all feature licenses purchased by the customer. A license for a feature can be a permanent license or a subscription-based license. The cloud-based license-management system can keep track of each license (e.g., its lifetime or whether it is issued to a customer device). Licenses not yet issued to customer devices are kept in the license pool.

If at least one license is available in the license pool, the cloud-based license-management system can issue the license to the requesting network device (operation 408). In one example, the network device can download a license file, and the cloud-based license-management system can register the identity of the network device (e.g., its serial number and/or MAC address) and associate the device's identity with the issued license. This allows the cloud-based license-management system to periodically (e.g., daily) validate the license for the network device.

If no license is available in the license pool, the cloud-based license-management system can send a license-pending notification to the network device (operation 410). In one example, the license-pending notification can be displayed on a display associated with the network device to remind the user that the newly activated feature does not have a valid license. In another example, the license-pending notification can be displayed at a management interface associated with the network device. According to some aspects, the network device may be able to use the feature without the license to avoid disruptions to the customer's network due to changes in the configuration of devices. However, the customer may not receive technical support or upgrades for the unlicensed feature. The license-pending notification can also be sent to the network device periodically (e.g., daily or weekly) to remind the customer to purchase the license. In certain situations, the customer's account in the cloud-based license-management system can be configured to automatically purchase licenses for the customer when needed. In such a situation, when the cloud-based license-management system receives a license request from a network device (e.g., from license-management unit 210 residing on network device 200, as shown in FIG. 2) and determines that the license pool associated with the customer runs out of licenses, the cloud-based license-management system can automatically purchase a license on behalf of the customer (e.g., via a previously set charge account). The newly purchased license can be added to the license pool (e.g., license pool 116 shown in FIG. 1) and then distributed to the network device. More specifically, the license-management system can send a license file or key to the network device, which can then store the license file or key at a predetermined memory location (e.g., within storage medium 224 shown in FIG. 2). The license-management system can also associate the newly purchased license with an identifier (e.g., serial number or MAC address) of the network device.

If the request is for the release of the license, the cloud-based license-management system can release the license from the network device and place the released license in the license pool (operation 412). For example, the cloud-based license-management system may communicate with the network device to delete the license file from the network device and update the customer record. Subsequently, the cloud-based license-management system can issue the license to a second network device (operation 414).

Figure 5:
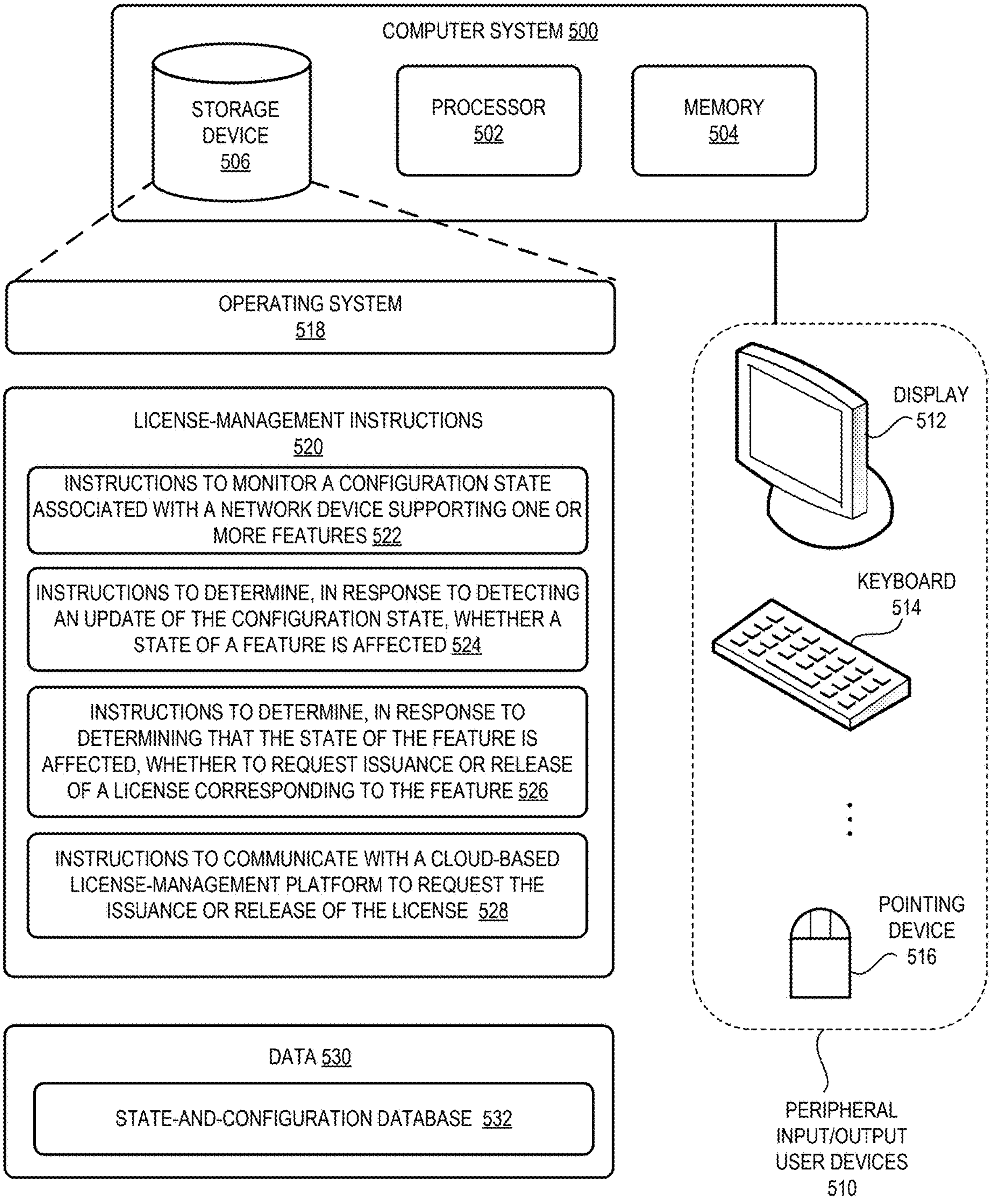
FIG. 5 illustrates a computer system 500 which facilitates flexible and dynamic management of feature licenses on a network device, according to one aspect of the instant application.

FIG. 5 illustrates a computer system 500 which facilitates flexible and dynamic management of feature licenses on a network device, according to one aspect of the instant application. Computer system 500 includes a processor 502, a memory 504, and a storage device 506. Furthermore, computer system 500 can be coupled to peripheral input/output (I/O) user devices 510 (e.g., a display device 512, a keyboard 514, and a pointing device 516). Storage device 506 includes a non-transitory computer-readable storage medium and stores an operating system 518, license-management instructions 520, and data 530. Computer system 500 may include fewer or more entities or instructions than those shown in FIG. 5. According to one aspect, computer system 500 can be implemented as part of a network device (e.g., network device 200), such as a switch, a router, an access point, etc.

License-management instructions 520 can include instructions, which when executed by computer system 500, can cause computer system 500 to perform methods and/or processes described in this disclosure. Specifically, license-management instructions 520 may include instructions 522 to monitor (e.g., by license-management unit 210 shown in FIG. 2) a configuration state associated with a network device supporting one or more features. The features can include advanced software features that need licenses to operate. The features can be preinstalled on the network device or can be downloadable. The network device can maintain a state-and-configuration database (e.g., state-and-configuration database 202 shown in FIG. 2) that allows all processes running on the network device to exchange state information. Instructions 522 can include instructions to monitor the state-and-configuration database to detect any configuration change on the network device. The change in the configuration may be caused by user input (e.g., a user entering a command via a CLI interface) or by changes in the network topology.

License-management instructions 520 can include instructions 524 to determine, in response to instructions 522 detecting an update of the configuration state, whether a state of a feature is affected. Some changes in the configuration state of the network device may cause the activation of a previously unused feature or the deactivation of a running feature.

License-management instructions 520 can include instructions 526 to determine (e.g., by license-management unit 210 shown in FIG. 2), in response to instructions 524 determining that the state of the feature is affected, whether to request issuance or release of a license corresponding to the feature. When a previously unused feature is activated, a license would be needed. When a previously running feature is deactivated, a license associated with that feature can be released.

License-management instructions 520 can include instructions 528 to communicate (e.g., via communication interface 222 shown in FIG. 2) with a cloud-based license-management platform (e.g., license-management system 114 shown in FIG. 1) to request the issuance or release of the license. The cloud-based license-management platform can manage feature licenses for all customers. For each customer, the cloud-based license-management platform can dynamically distribute feature licenses among the customer's network devices via a license pool (e.g., license pool 116 shown in FIG. 1). The cloud-based license-management platform can issue a license in the license pool to a requesting network device and place a license released from a network device to the license pool.

Data 530 can include state-and-configuration database 532 that stores the states and configurations associated with various software and hardware components within the network device.

License-management instructions 520 may include more instructions than those shown in FIG. 5. For example, license-management system 520 can also store instructions for updating the license status of the feature and running the feature according to the license status. In a further example, license-management system 520 can also store instructions for periodically validating the license.

Figure 6:
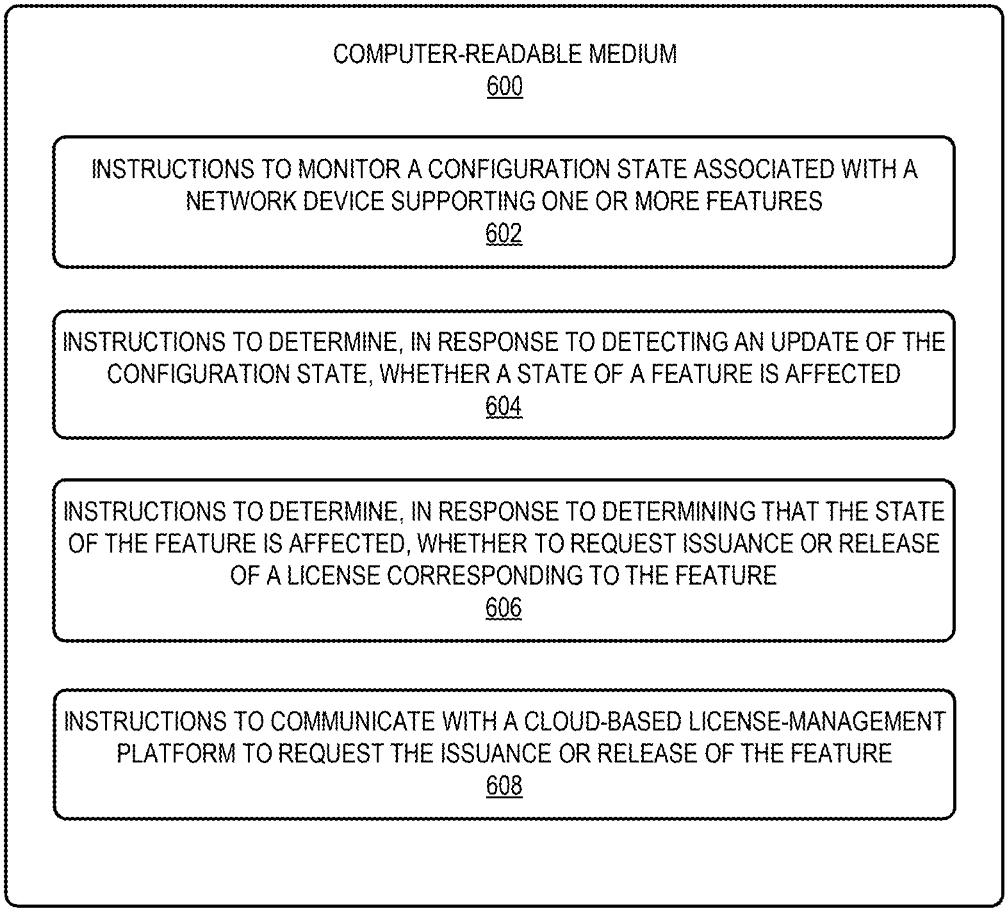
FIG. 6 illustrates a computer-readable medium (CRM) 600 which facilitates flexible and dynamic management of feature licenses on a network device, according to one aspect of the instant application.

FIG. 6 illustrates a computer-readable medium (CRM) 600 which facilitates flexible and dynamic management of feature licenses on a network device, according to one aspect of the instant application. CRM 600 can be a non-transitory computer-readable medium or device storing instructions that when executed by a computer or processor cause the computer or processor to perform a method. CRM 600 can store instructions 602 to monitor (e.g., by license-management unit 210 shown in FIG. 2) a configuration state associated with a network device supporting one or more features; instructions 604 to determine (e.g., by license-management unit 210 shown in FIG. 2), in response to instructions 522 detecting an update of the configuration state, whether a state of a feature is affected; instructions 606 to determine (e.g., by license-management unit 210 shown in FIG. 2), in response to instructions 524 determining that the state of the feature is affected, whether to request issuance or release of a license corresponding to the feature; and instructions 608 to communicate (e.g., via communication interface 222 shown in FIG. 2) with a cloud-based license-management platform (e.g., license-management system 114 shown in FIG. 1) to request the issuance or release of the license.

CRM 600 may include more instructions than those shown in FIG. 6. For example, CRM 600 can also store instructions for updating the license status of the feature, instructions for running the feature according to the license status, and instructions for periodically validating the license.

In general, this disclosure describes a solution to the technical problem of flexible and dynamic management of feature licenses on a network device. According to the solution, the feature licenses can be issued or released based on the instant configuration of the network device. The network device can include a feature-monitoring unit that monitors its state-and-configuration database to detect changes in the configuration state, which may result in a state change of one or more features. When a feature is activated or deactivated, a license-management unit on the network device can communicate with a cloud-based license-management platform to request the issuance or release of a corresponding license. The cloud-based license-management platform can keep track of all licenses purchased by a customer and dynamically allocate or revoke licenses for network devices based on the instant configurations of all devices.

The network device can also include a feature-management unit that can update the licensing state of features in the state-and-configuration database such that these features can operate according to their licensing states. In one example, a feature may operate without a license by entering an honor-based mode and periodically receive a license-pending notification. The cloud-based license-management platform can also communicate with the license-management unit on the network device periodically to validate issued licenses. Responsive to detecting an expired or invalidated license, the license-management unit can configure the corresponding feature to operate in the honor-based mode, and a notification regarding the expired/invalidated license can be sent to the customer periodically.

One aspect of the instant application describes a method, a computer system, and a computer-readable medium that facilitate flexible and dynamic management of feature licenses on a network device. During operation, a network device supporting one or more features can monitor a configuration state associated with the network device. In response to detecting an update of the configuration state, the network device can determine whether a state of a feature is affected. In response to determining that the state of the feature is affected, the network device can determine whether to request issuance or release of a license corresponding to the affected feature and communicate by the network device with a cloud-based license-management platform to request the issuance or release of the license.

In a variation on this aspect, in response to determining that the feature is activated, the network device can request the issuance of the license; and in response to determining that the feature is deactivated, the network device can request the release of the license.

In a variation on this aspect, subsequent to communicating with the cloud-based license-management platform to request the issuance of the license, the network device can receive an issued license in response to the cloud-based license-management platform determining that a license pool associated with a user of the network device has at least one remaining license corresponding to the affected feature. The network device can receive a license-pending notification in response to the cloud-based license-management platform determining that no such license is available in the license pool.

In a further variation, subsequent to receiving the issued license or the license-pending notification, the network device can update a license status associated with the affected feature and run the affected feature based on the license status.

In a further variation, running the affected feature based on the license status can include running the affected feature in a normal mode in response to receiving the issued license and running the affected feature in an honor-based mode in response to receiving the license-pending notification.

In a further variation, running the affected feature in the honor-based mode can include periodically receiving the license-pending notification.

In a further variation, running the affected feature in the normal mode can include periodically communicating with the cloud-based license-management platform to validate the license.

In a variation on this aspect, communicating with a cloud-based license-management platform to request the release of the license can cause the cloud-based license-management platform to add the released license to a license pool associated with a user of the network device and to issue the released license to a second network device.

In a variation on this aspect, the network device can include a switch, and the configuration state associated with the network device can include a virtual switch configuration.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method comprising:

monitoring, by a network device supporting one or more features, a configuration state associated with the network device;

in response to detecting an update of the configuration state, determining whether a feature is activated or deactivated;

in response to determining that the feature is activated, requesting issuance of a license corresponding to the activated feature by communicating with a cloud-based license-management platform;

in response to receiving an issued license corresponding to the activated feature, running the activated feature in a normal mode;

in response to receiving a license-pending notification corresponding to the activated feature, running the activated feature in an honor-based mode; and in response to determining that the feature is deactivated, requesting release of a license corresponding to the deactivated feature by communicating with the cloud-based license-management platform.

2. The method of claim 1, further comprising:

subsequent to communicating with the cloud-based license-management platform to request the issuance of the license, receiving, by the network device, the issued license in response to the cloud-based license-management platform determining that a license pool associated with a user of the network device has at least one remaining license corresponding to the activated feature; and receiving the license-pending notification in response to the cloud-based license-management platform determining that no such license is available in the license pool.

3. The method of claim 2, further comprising:

subsequent to receiving the issued license or the license-pending notification, updating a license status associated with the activated feature.

4. The method of claim 1, wherein running the activated feature in the honor-based mode comprises periodically receiving the license-pending notification.

5. The method of claim 1, wherein running the activated feature in the normal mode comprises periodically communicating with the cloud-based license-management platform to validate the license.

6. The method of claim 1, wherein communicating with a cloud-based license-management platform to request the release of the license causes the cloud-based license-management platform to add the released license to a license pool associated with a user of the network device and to issue the released license to a second network device.

7. The method of claim 1, wherein the network device comprises a switch, and wherein the configuration state associated with the network device comprises a virtual switch configuration.

8. A network device, comprising:

a processing resource; and a non-transitory machine-readable storage medium comprising instructions executable by the processing resource to:

monitor a configuration state associated with the network device, which supports one or more features;

in response to detecting an update of the configuration state, determine whether a feature is activated or deactivated;

in response to determining that the feature is activated, requesting issuance of a license corresponding to the activated feature by communicating with a cloud-based license-management platform to request the issuance or release of the license;

in response to receiving an issued license corresponding to the activated feature, running the activated feature in a normal mode;

in response to receiving a license-pending notification corresponding to the activated feature, running the activated feature in an honor-based mode; and in response to determining that the feature is deactivated, requesting release of a license corresponding to the deactivated feature by communicating with the cloud-based license-management platform.

9. The network device of claim 8, the instructions further to:

subsequent to communicating with the cloud-based license-management platform to request the issuance of the license, receive the issued license in response to the cloud-based license-management platform determining that a license pool associated with a user of the network device has at least one remaining license corresponding to the activated feature; and receiving a license-pending notification in response to the cloud-based license-management platform determining that no such license is available in the license pool.

10. The network device of claim 9, the instructions further to:

subsequent to receiving the issued license or the license-pending notification, update a license status associated with the activated feature.

11. The network device of claim 8, wherein running the activated feature in the honor-based mode further comprises periodically receiving the license-pending notification.

12. The network device of claim 8, wherein running the activated feature in the normal mode comprises periodically communicating with the cloud-based license-management platform to validate the license.

13. The network device of claim 8, wherein communicating with a cloud-based license-management platform to request the release of the license causes the cloud-based license-management platform to add the released license to a license pool associated with a user of the network device and to issue the released license to a second network device.

14. The network device of claim 8, wherein the network device comprises a switch, and wherein the configuration state associated with the network device comprises a virtual switch configuration.

15. A non-transitory computer-readable storage medium storing instructions to:

monitor a configuration state associated with a network device supporting one or more features;

in response to detecting an update of the configuration state, determine whether a feature is activated or deactivated;

in response to determining that the feature is activated, requesting issuance of a license corresponding to the activated feature by communicating with a cloud-based license-management platform;

in response to receiving an issued license corresponding to the activated feature, running the activated feature in a normal mode;

in response to receiving a license-pending notification corresponding to the activated feature, running the activated feature in an honor-based mode; and in response to determining that the feature is deactivated, requesting release of a license corresponding to the deactivated feature by communicating with the cloud-based license-management platform.

16. The non-transitory computer-readable storage medium of claim 15, the instructions further to:

subsequent to communicating with the cloud-based license-management platform to request the issuance of the license, receive an issued license in response to the cloud-based license-management platform determining that a license pool associated with a user of the network device has at least one remaining license corresponding to the activated feature; and receive a license-pending notification in response to the cloud-based license-management platform determining that no such license is available in the license pool.

* * * * *